United States Patent
Valvo et al.

(10) Patent No.: US 8,755,689 B2
(45) Date of Patent: Jun. 17, 2014

(54) METHOD FOR LOCALIZING AN OPTICAL NETWORK TERMINATION IN AN OPTICAL ACCESS NETWORK

(75) Inventors: Maurizio Valvo, Turin (IT); Roberto Mercinelli, Turin (IT); Paolo Solina, Turin (IT)

(73) Assignee: Telecom Italia S.p.A., Milan (IT)

( * ) Notice: Subject to any disclaimer, the term of this patent is extended or adjusted under 35 U.S.C. 154(b) by 737 days.

(21) Appl. No.: 12/994,801

(22) PCT Filed: May 29, 2008

(86) PCT No.: PCT/EP2008/056616
§ 371 (c)(1),
(2), (4) Date: Nov. 26, 2010

(87) PCT Pub. No.: WO2009/143893
PCT Pub. Date: Dec. 3, 2009

(65) Prior Publication Data
US 2011/0076013 A1   Mar. 31, 2011

(51) Int. Cl.
*H04J 14/00* (2006.01)
(52) U.S. Cl.
USPC ............ 398/72; 398/100; 398/67; 398/33; 398/30; 370/352; 370/392; 370/389; 370/468
(58) Field of Classification Search
USPC ........... 398/66, 67, 68, 69, 70, 71, 72, 98, 99, 398/100, 33, 38, 3, 4, 5, 25, 15, 30, 31, 45, 398/48, 50; 370/352, 392, 389, 468, 400, 370/401, 465, 395.31
See application file for complete search history.

(56) References Cited

U.S. PATENT DOCUMENTS 7,224,896 B1 * 5/2007 Needle et al. ............... 398/4
8,224,181 B2 * 7/2012 Rohde et al. ............... 398/15

OTHER PUBLICATIONS

Rohde, et al., "Securing Passive Optical Networks Against Signal Injection Attacks", Optical Network Design and Modeling, (Lecture Notes in Computer Science), vol. 4534, XP019060024, pp. 96-100, (May 29, 2007).
Yuksel, et al., "Optical Layer Monitoring in Passive Optical Networks (PONs): A Review", Transparent Optical Networks, ICTON 2008, 10$^{th}$ Anniversary International Conference ON, IEEE, Piscataway, NJ, XP031306064, pp. 92-98, (Jun. 22, 2008).
Herrmann, et al., "Statistical Optical Analysis of Passive Optical Networks Provides "Plug and Play" Installation With Fiber in the Loop System", Optical/Hybrid Access Networks, XP010224064, pp. 3.04.01 to 3.04.06, (Sep. 7, 1993).

* cited by examiner

*Primary Examiner* — Hanh Phan
(74) *Attorney, Agent, or Firm* — Oblon, Spivak, McClelland, Maier & Neustadt, L.L.P.

(57) ABSTRACT

A method for localizing an optical network termination in an optical access network including an optical line termination and a number of optical links. The method includes: detecting that the optical network termination is connected to an optical link and retrieving from it a termination identifier univocally identifying the optical network termination, using the termination identifier for retrieving an optical link identifier associated with the termination identifier and univocally identifying a given optical link of the optical links; inducing a change in an optical connection between the optical line termination and the given optical link, thus modifying an optical parameter of first optical signals received at the optical line termination through the given optical link; checking whether second optical signals received at the optical line termination from the optical network termination are affected by the change; and in the affirmative, determining that the optical network termination is connected to the first optical link.

14 Claims, 4 Drawing Sheets

METHOD FOR LOCALIZING AN OPTICAL NETWORK TERMINATION IN AN OPTICAL ACCESS NETWORK

CROSS REFERENCE TO RELATED APPLICATION

This application is a national phase application based on PCT/EP2008/056616, filed May 29, 2008, the content of which is incorporated herein by reference.

TECHNICAL FIELD

The present invention generally relates to the field of optical access networks. In particular, the present invention relates to a method for localizing an optical network termination in an optical access network. Further, the present invention relates to an optical access network suitable for implementing the above method.

BACKGROUND ART

It is known that an optical access network allows a plurality of users to access a number of broadband services, such as for instance Internet access, video-on-demand and telephone services.

Among the known optical access networks, passive optical networks (briefly termed PON) are becoming even more widespread. Typically, a PON comprises an optical line termination (briefly termed OLT) and an optical distribution network (briefly termed ODN). The ODN comprises a plurality of optical links (typically comprising silica-based single-mode standard optical fibers) and optical splitters arranged so as to form a tree structure whose root is the OLT.

The ODN is suitable for allowing the OLT to exchange traffic with users connected at the far end of the optical links at transmission rates which can be higher than 100 Mbit/s. This advantageously allows the users to share the usage (and therefore the costs) of the OLT, thus allowing them to access broadband data services and broadband telephone services at acceptable costs.

A PON may be used for different applications. In most cases, the OLT is installed at a central office, while the optical links of the ODN are at least partially installed in underground pipes.

For instance, when the PON is used for FTTH (Fiber To The Home) applications, the ODN is arranged so that one of its optical splitters is installed e.g. at the basement of a building. Besides, the optical links radiating from the optical splitter are installed within suitable cable trays, which vertically run through the building from the basement up to the various floors. Each optical link is terminated within a respective apartment by means of a plug. A user wishing to access the broadband services supported by the PON may either buy or lease a suitable optical network termination (briefly termed ONT) and connect the ONT directly to the plug located in his apartment.

On the other hand, when the PON is used for FTTB (Fiber To The Building) applications, the far end of each optical link of the ODN reaches the basement of a respective building. Each optical link is then terminated by means of an optical network unit (briefly termed ONU). Each ONU is suitable for exchanging traffic with the users residing in the building, e.g. by means of a high speed transmission system (such as for instance ADSL or VDSL) using the twisted pairs of the fixed telephone network (PSTN, Public Switch Telephone Network).

A PON may also be employed for other applications, such as FTTC (Fiber To The Curb) and FTTCab (Fiber To The Cabinet). A same PON may also support different applications. For instance, a same OLT may be connected to first optical links supporting FTTH applications, second optical links supporting FTTB applications, and third optical links supporting FTTC or FTTCab applications.

The document "Securing Passive Optical Networks Against Signal Injection Attacks" by H. Rohde et al., Optical Network Design and Modelling, pages 96-100, ISBN 978-3-540-72729-3, discloses to avoid that a single user or a failing terminal degrades (or even disables) a passive optical network for other connected users by sending light permanently or casually. To this purpose, this document discloses to provide each optical link of the PON with a respective optical switch. In case a permanent signal is detected from some ONUs, a controller can firstly detect that such a continuous signal is sent, and then identify the port by briefly disconnecting the users, invoking the switches. Once the attacking port is identified, i.e. when during a switch-off the permanent signal disappears, the corresponding port can be switched off and maintenance personnel can react on the malfunctioning of the ONU.

SUMMARY OF THE INVENTION

The Applicant has noticed that, disadvantageously, in case of FTTH applications, when a user connects his ONT to a plug of a PON, the OLT is not able to localize the ONT, i.e. to identify the plug (i.e. the optical link) to which the ONT has been connected.

Indeed, when a user buys or leases an ONT, for accessing broadband services from his apartment he simply has to connect the ONT to the plug. This operation is very simple and short, thanks to the passive nature of the PON. However, the passive nature of the PON disadvantageously does not allow to check whether the user is accessing the broadband services from his apartment or from another apartment served by the same ODN.

This is disadvantageous for the service provider, since the service provider can not prevent the so-called "ONT relocation" (also known as "nomadism").

Indeed, a user may buy a subscription for a given packet of broadband services, together with an ONT. Upon subscription, the user is typically requested to provide his personal data identifying, inter alia, the optical link to which he intends to connect the ONT for accessing the broadband services.

However, since the PON is not able to localize the ONT, the user may decide to share the use of the ONT (and then the access to the subscribed broadband services) with one or more other users residing in the same building or in other buildings served by the same ODN, by simply moving the ONT from one apartment to the other. Indeed, the ONT may be freely connected to any of the optical links radiating from the same OLT, since the PON is not capable of determining the optical link to which the ONT is connected.

Therefore, disadvantageously, a group of users residing in an area served by the same ODN can freely share a single subscription and a single ONT. This is not acceptable for a service provider, since a subscription (and then the ONT sold or leased together with the subscription) is intended for a single user, and not for sharing among different users. It is therefore important for a service provider to determine that an ONT which has been bought or leased by a user is always used by connecting it to the optical link which has been declared by the user upon subscription.

A solution may be, for instance, measuring the round trip delay of traffic associated to each single optical link, which depends on the length of the optical link. Indeed, each optical link has a respective length, which depends on the distance between the OLT and the apartment in which the optical link is terminated with the plug, increased by the optical distance between the plug and the ONT. Therefore, the OLT could localize an ONT by measuring the round trip delay of its traffic, thus deriving the distance of the ONT from the OLT, and therefore the optical link to which the ONT is connected.

However a user may wish to move the ONT within his apartment by adding a fibre patch cord which typically has a length of a few meters. Hence, the resolution of the round trip delay measurement for localization of the ONT should not exceed the typical length of the fibre patch cord.

Hence, this solution is disadvantageous in that different optical links may have substantially the same length (i.e. their lengths may differ of a quantity lower than the achievable resolution, e.g. when they are terminated within apartments located in the same building or on the same floor of the building). Therefore, an ONT connected to any of such optical links would always exhibit a same round trip delay, thus not allowing to univocally identify the optical link to which the ONT is actually connected. The ONT could then be moved from one apartment to the other(s) on the same floor or in the same building, without the service provider becoming aware of this.

Accordingly, the Applicant has tackled the problem of providing a method for localizing an optical network termination of an optical access network (in particular, but not exclusively, a PON) which allows the service provider to check that the optical network termination is always used by connecting it to the optical link which has been declared by the user upon subscription, even when in the optical access network different optical links have substantially the same length.

According to a first aspect, the present invention provides a method for localizing an optical network termination in an optical access network, the optical access network comprising an optical line termination and a number n of optical links, the optical network termination being connectable to the optical line termination by means of any of the optical links, the method comprising the following steps:

a) detecting that the optical network termination is connected to one of the optical links and retrieving from it a termination identifier univocally identifying the optical network termination;
b) using the termination identifier for retrieving an optical link identifier associated to the termination identifier and univocally identifying a given optical link of the optical links;
c) inducing a change in an optical connection between the optical line termination and the given optical link, thus modifying an optical parameter of first optical signals received at the optical line termination through the given optical link;
d) checking whether second optical signals received at the optical line termination from the optical network termination are affected by the change; and
e) in the affirmative, determining that the optical network termination is connected to the first optical link.

Preferably, the method further comprises, before step b), a step of acquiring localization information from a user of the optical network termination and determining the optical link identifier associated to the termination identifier by processing the localization information.

Preferably, the step of acquiring localization information comprises one of the following steps:
acquiring an address of the user; and
acquiring a plug identifier identifying a plug terminating one of the optical links.

Preferably, the method further comprises, before step b), a step of determining the optical link identifier associated to the termination identifier when the network termination is firstly connected to the optical access network through the given optical link.

Preferably, step a) comprises exchanging authentication information between the optical line termination and the optical network termination and retrieving the termination identifier from the authentication information.

Preferably, step c) comprises modifying an optical parameter of the first optical signals passing through the optical connection, the optical parameter being one of: frequency, phase, amplitude, optical power and optical delay.

Preferably, step c) comprises opening an optical switch suitable to connect the optical line termination to the given optical link; and step d) comprises checking whether the second optical signals are still received at the optical line termination.

Alternatively, step c) comprises increasing an attenuation induced by a variable optical attenuation suitable to connect the optical line termination to the given optical link; and step d) comprises checking whether an optical power of the second optical signals received at the optical line termination is reduced.

According to a second aspect, the present invention provides an optical access network comprising an optical line termination, a number n of optical links, an optical connection connecting the optical line termination to a given optical link of the optical links and an optical network termination suitable for being connected to any of the optical links, wherein the optical access network further comprises:
a remote control unit suitable for operating the optical connection so as to induce a change in a optical parameter of first optical signals received at the optical line termination through the given optical link; and
a central control unit suitable to determine whether the optical network termination is connected to the given optical link by checking whether the change has affected second optical signals received at the optical line termination from the optical network termination.

Preferably, the optical connection comprises an optical switch suitable for being switched between an open status and a close status by the remote control unit.

Alternatively, the optical connection comprises a variable optical attenuator suitable for being switched between a first status and a second status by the remote control unit, the variable optical attenuator in the first status inducing a working attenuation on the first optical signals, and the variable optical attenuator in the second status inducing a check attenuation on the first optical signals, the working attenuation being different than the check attenuation.

Preferably, the remote control unit and the central control unit are linked by a control channel, the control channel being separated from the optical links.

Preferably, the optical access network further comprises an optical splitter between the optical line termination and the optical connection, the optical splitter and the optical connection being part of a same integrated optical device.

Preferably, the remote control unit further comprises a power supply terminal suitable for supplying the remote control unit by drawing electrical current from a remote generator or from an electrical mains.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
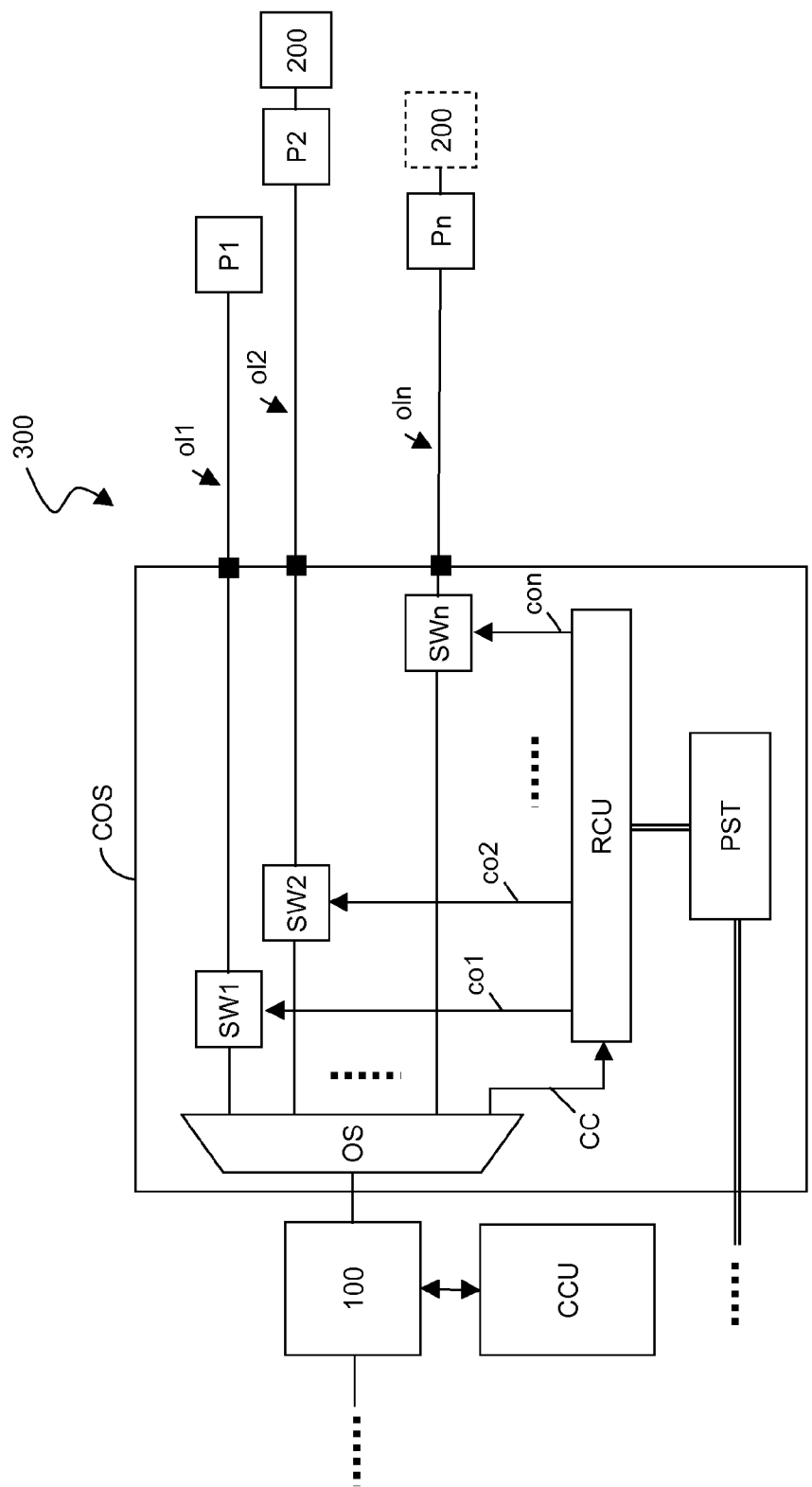
FIG. 1 schematically shows a PON suitable for implementing the method according to a first embodiment of the present invention.

FIG. 1 schematically shows a PON suitable for implementing the method according to a first embodiment of the present invention.

The PON of FIG. 1 preferably comprises an OLT 100, a central control unit CCU cooperating with the OLT 100 and an ODN 300. Preferably, the ODN comprises a number n of optical links ol1, ol2, . . . , oln, a number n of plugs P1, P2, . . . , Pn, and a controllable optical splitter COS. The ODN may also comprise optical splitters, other controlled optical splitters and other optical links connected to the OLT 100, which for simplicity are not shown in FIG. 1.

Preferably, each optical link ol1, ol2, . . . , oln comprises an optical fiber. More preferably, the optical fiber is a silica-based single-mode standard optical fiber of the type mentioned above. Preferably, the number n of optical links is equal to 7, 15, 31, 63 or 127. The optical links ol1, ol2, . . . , oln may have all a same length, or they may have different lengths.

The OLT 100 and the central control unit CCU are preferably installed at a central office and, under the assumption that the PON of FIG. 1 is used for FTTH applications, the controllable optical splitter COS is preferably located at the basement of a building, while the optical links ol1, ol2, . . . , oln are preferably installed within suitable cable trays, which vertically run through the building from the basement up to the various floors. Each optical link ol1, ol2, . . . , oln is terminated within a respective apartment by means of a respective plug P1, P2, . . . , Pn.

The controllable optical splitter COS is suitable for connecting the OLT 100 to the optical links ol1, ol2, . . . oln. To this purpose, the controllable optical splitter COS preferably comprises an optical splitter OS having a network-side port and n+1 user-side ports.

Preferably, the network-side port of the optical splitter OS is connected to the OLT 100. Further, preferably, each of n user-side ports of the optical splitter OS is connected to a respective optical link ol1, ol2, . . . , oln by means of a respective optical switch SW1, SW2, . . . , SWn.

According to first variants of this first embodiment, the optical splitter OS and the optical switches SW1, SW2, . . . , SWn are discrete components. According to second variants, the optical splitter OS and the optical switches SW1, SW2, . . . , SWn are part of a same integrated optical device.

Further, preferably, the controllable optical splitter COS comprises a remote control unit RCU. Preferably, one of the user-side ports of the optical splitter OS is connected to the remote control unit RCU, thus forming a control channel CC whose role will be described in detail herein after. Further, preferably, the remote control unit RCU has a number n of control outputs co1, co2, . . . , con. Each control output co1, co2, . . . , con is preferably connected to a respective optical switch SW1, SW2, . . . , SWn.

Further, preferably, the controllable optical splitter COS comprises a power supply terminal PST, which is suitable for supplying the remote control unit RCU and the optical switches SW1, SW2, . . . , SWn by drawing electrical current from a remote generator (not shown in FIG. 1) or from the electrical mains.

Preferably, the n control outputs co1, co2, . . . con are suitable for transmitting control signals from the remote control unit RCU to the optical switches SW1, SW2, . . . , SWn, in order to selectively switch them between their open status and their close status.

When all the optical switches SW1, SW2, . . . , SWn are in their close status, the OLT 100 is actually optically connected to all the optical links ol1, ol2, . . . , oln. Therefore, the OLT 100 can exchange traffic in the form of optical signals with an ONT connected to any of the plugs P1, P2, . . . , Pn. On the other hand, if one of the optical switches SW1, SW2, . . . , SWn is switched to its open status (e.g. the optical switch SW1), the corresponding optical link (i.e. ol1) is no more optically connected to the OLT 100, and therefore the OLT can not receive any optical signal from an ONT connected to the plug terminating such an optical link (i.e. P1).

According to a first embodiment of the present invention, the above described switching mechanism of the optical switches SW1, SW2, . . . , SWn is used for localizing an ONT, i.e. for allowing a service provider to check whether an ONT bought or leased by a given user upon subscription is actually used by connecting it always to the optical link which has been declared by the user upon subscription.

Figure 2:
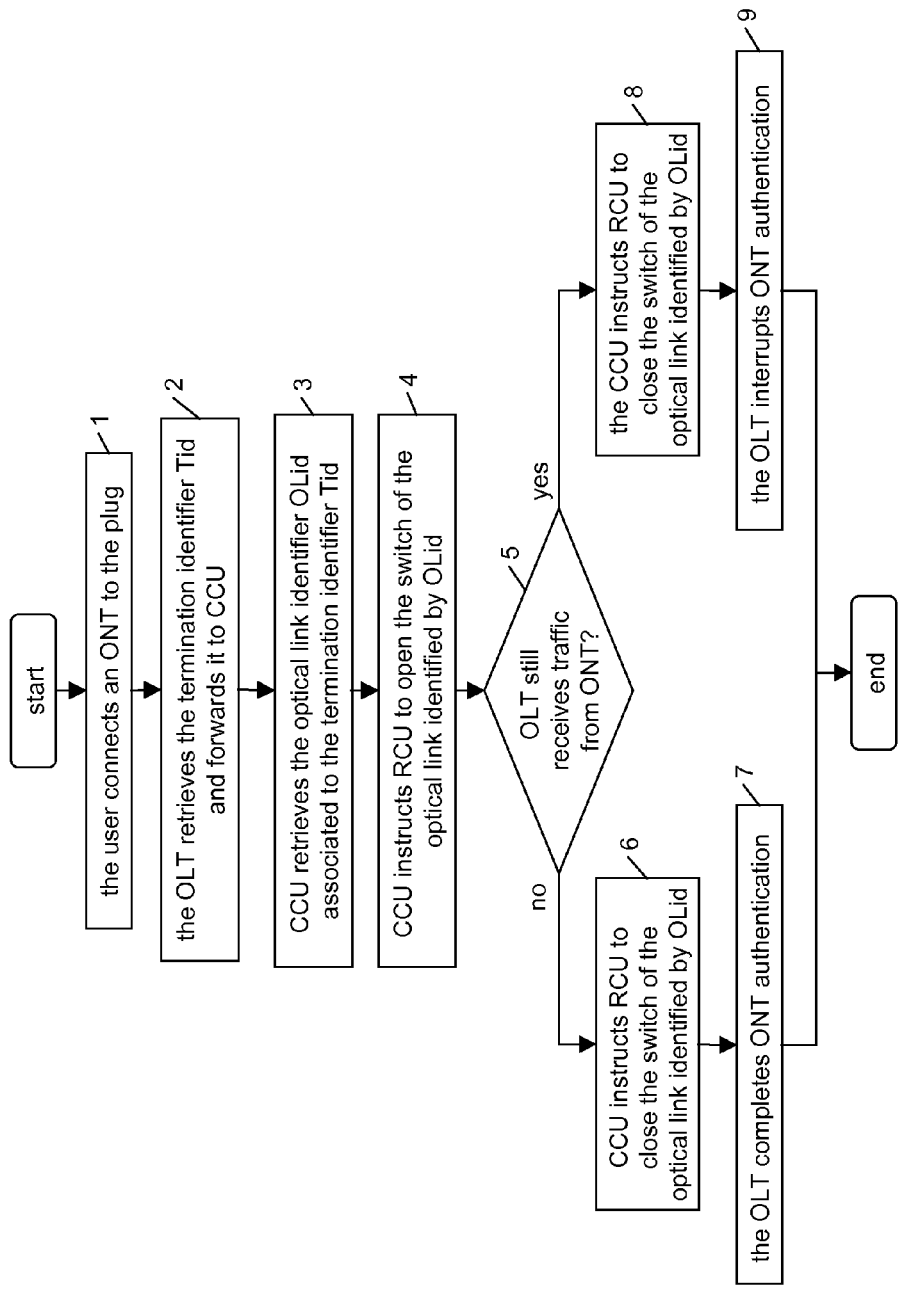
FIG. 2 is a flow chart showing the authentication procedure performed when an ONT is connected to the PON of FIG. 1.

In particular, by referring now to FIG. 2, it is assumed that a user residing in the building in which the optical links ol1, ol2, . . . , oln of FIG. 1 are installed buys a subscription for a given packet of broadband services distributed by means of the PON of FIG. 1. Preferably, upon subscription the user is requested to provide the service provider with localization information allowing the service provider to determine an optical link identifier OLid univocally identifying the optical link to which the user intends to connect the ONT for accessing the broadband services.

For instance, the localization information may comprise a user's complete address including: city, street, street number, stair (if applicable), floor and apartment. In this case, preferably, the service provider may access a database storing associations between complete addresses and optical link identifiers. Such a database is preferably updated by the PON operator that, each time the installation of an optical link in a given apartment is completed, inserts a new association between the complete address identifying the apartment and the optical link identifier identifying the installed optical link which terminates in the apartment.

Alternatively, the localization information may comprise a plug code which the user may retrieve e.g. by reading it on a label applied to the plug terminating the optical link in his apartment. Advantageously, the plug code may be the optical link identifier OLid itself.

Herein after, it is assumed that the user resides in the apartment in which the optical link ol2 is terminated by means of the plug P2. Accordingly, the optical link identifier OLid determined by the service provider according to the localization information provided by the user during subscription identifies the optical link ol2.

Further, as mentioned above, upon subscription the user either buys or leases an ONT 200 for accessing the subscribed services. Preferably, the ONT 200 has a termination identifier Tid, which univocally identifies it. For instance, the termination identifier Tid may be the serial number of the ONT 200.

Preferably, during subscription, the service provider preferably stores an association between the optical link identifier OLid determined according to the localization information provided by the user and the termination identifier Tid of the ONT 200 bought or leased by the user. Further, preferably, the service provider stores this association so that it may be accessed by the central control unit CCU. For instance, the service provider may store the association in a central database which can be accessed by the central control unit CCU. Alternatively, the service provider may send the association to the central control unit CCU, which stores it in a local database (not shown in FIG. 1).

By referring to FIG. 2, when the user accesses the subscribed services for the first time, he preferably connects the ONT 200 to a plug (step 1). It is initially supposed that the user actually connects the ONT 200 to the optical link terminating with the plug in his apartment, i.e. the optical link ol2, as shown in FIG. 2.

Further, it is assumed that all the optical switches SW1, SW2, . . . , SWn of the PON of FIG. 1 are in their close status, so that the OLT 100 may potentially exchange traffic in the form of optical signals with the ONT 200 independently of the optical link to which the ONT 200 is connected.

Since the OLT 100 is optically connected to the ONT 200, the OLT 100 starts transmitting and receiving authentication information to and from the ONT 200, through which the OLT 100 recognizes the ONT 200. In particular, according to embodiments of the present invention, the authentication information received by the OLT 100 preferably comprises the termination identifier Tid, and the OLT 100 is preferably configured to retrieve such a termination identifier Tid by processing the received authentication information and to forward it to the central control unit CCU (step 2).

Then, the central control unit CCU, which as mentioned above may access the association between the optical link identifier OLid determined according to the localization information provided by the user during subscription and the termination identifier Tid of the ONT 200 bought or leased by the user, preferably uses the retrieved termination identifier Tid for retrieving the optical link identifier OLid associated to the termination identifier Tid (step 3).

Then, the central control unit CCU instructs the remote control unit RCU by means of the control channel CC to open the optical switch connecting the optical splitter OS to the optical link identified by the retrieved optical link identifier OLid (step 4). In particular, since it has been assumed that the optical link identifier OLid determined according to the localization information provided by the user during subscription is the identifier of the optical link ol2, during step 4 the central control unit CCU preferably instructs the remote control unit RCU to open the optical switch SW2.

Therefore, after step 4 is completed, the OLT 100 is no more connected to the optical link ol2, while it still continues being connected to the remaining optical links.

Then, the central control unit CCU checks whether the OLT 100 still receives traffic in the form of optical signals from the ONT 200 (step 5).

In the negative, the central control unit CCU determines that the ONT 200 is actually connected to the optical link determined according to the localization information provided by the user during subscription, i.e. the optical link ol2. Therefore, the central control unit CCU preferably instructs the remote control unit RCU to close the optical switch which has been opened during step 4 (i.e. SW2), thus restoring the optical connection between the OLT 100 and the ONT 200 (step 6). Then, preferably, the OLT 100 successfully completes the authentication of the ONT 200 (step 7), thus allowing the user to access any of the subscribed services by means of the ONT 200.

On the other hand, if during step 5 the central control unit CCU determines that the OLT 100 still continues receiving traffic from the ONT 200 even though the optical switch SW2 is open, the central control unit CCU determines that the ONT 200 is not connected to the optical link determined according to the localization information provided by the user during subscription, since the optical connection between the OLT 100 and the optical link identified by the optical link identifier OLid is interrupted and, accordingly, also the optical connection between the OLT 100 and the ONT 200 should be interrupted.

This situation occurs if the user connects the ONT 200 to an optical link other than the one identified by the optical link identifier OLid, e.g. the optical link oln, as shown in FIG. 1 with dashed lines.

In this case, the control unit CCU preferably instructs the remote control unit RCU to close the optical switch which has been opened during step 4 (i.e. SW2), thus restoring the optical connection between the OLT 100 and the optical link ol2 (step 8). Then, preferably, the OLT 100 preferably interrupts the authentication of the ONT 200 (step 9), and possibly the central control unit CCU instructs the OLT 100 to send a deactivation command to the ONT 200. In this way, the user who tried to access the subscribed services by connecting the ONT 200 to an optical link other than the one determined according to the localization information provided during subscription is prevented from accessing the services.

Therefore, advantageously, the service provider may check whether the user actually uses the ONT 200 by connecting it to the optical link which has been determined according to the localization information provided by the user upon subscription, and not to other optical links of the same PON.

Further, the procedure shown in FIG. 2 may be advantageously performed not only when the user activates the ONT 200 for the first time, but it can be repeated each time the ONT 200 is activated by the user. This advantageously allows the service provider to check that, each time the ONT 200 is activated, it is actually connected to the link which has been determined according to the localization information provided by the user upon subscription, and not to other optical links of the same PON. This advantageously prevents the user from relocating his ONT to the purpose of sharing his subscription to broadband services with other users. The service provider may therefore be certain that each subscription to a given packet of broadband services is actually enjoyed by a single user from a single location (i.e. from a single plug).

Further, advantageously, the above described procedure shown in FIG. 2 substantially has the same duration of a traditional authentication procedure of an ONT at an OLT. Indeed, the steps 4 and 5, which allow to determine whether the ONT is actually connected to the optical link determined according to the localization information by the user during subscription, may take only few seconds. In particular, opening the optical switch for few seconds is enough for allowing the central control unit to determine whether the optical connection between the OLT and the optical link identified by the optical link identifier OLid is interrupted. Accordingly, such steps extend the authentication procedure by only few seconds. Further, the user is not requested to perform any additional operation in comparison to the known authentication procedure. In view of the above, checking whether an ONT is actually connected to the optical link determined according to the localization information provided by the user during subscription is substantially transparent for the user.

Further, advantageously, the ratio between the benefits provided to the service provider by the PON of FIG. 1 and the cost of the PON of FIG. 1 is greater than that of a known PON. Indeed, the benefits due to the possibility to localize the ONTs outweigh the additional costs due to the inclusion in the PON of active devices (i.e. the remote control unit RCU and the optical switches SW1, SW2, . . . , SWn), which require power supply and whose cost is not negligible.

Further, advantageously, the Applicant has determined that the power consumption of such active devices advantageously is very low. Indeed, by assuming that the optical switches SW1, SW2, . . . , SWn are implemented as discrete components, each optical switch requires about 0.3 W. Besides, the remote control unit RCU requires a few Watts. Therefore, by assuming e.g. that the PON comprises 16 optical links the power consumption is of about 10 W, while by assuming that the PON comprises 32 optical links the power consumption is of about 15 W. Advantageously, since the electrical power consumption of the controlled optical splitter COS is very low, it can be powered from a remote location, such as for instance by means of a dedicated powering unit located at the central office where the OLT and central control unit CCU are located, by using e.g. traditional twisted pairs. This advantageously allows to keep the cost of the PON very low, the low cost being a very important requirement in particular in case of FTTH applications, where the cost of the PON is shared between a relatively low number of users (typically up to 64).

Figure 3:
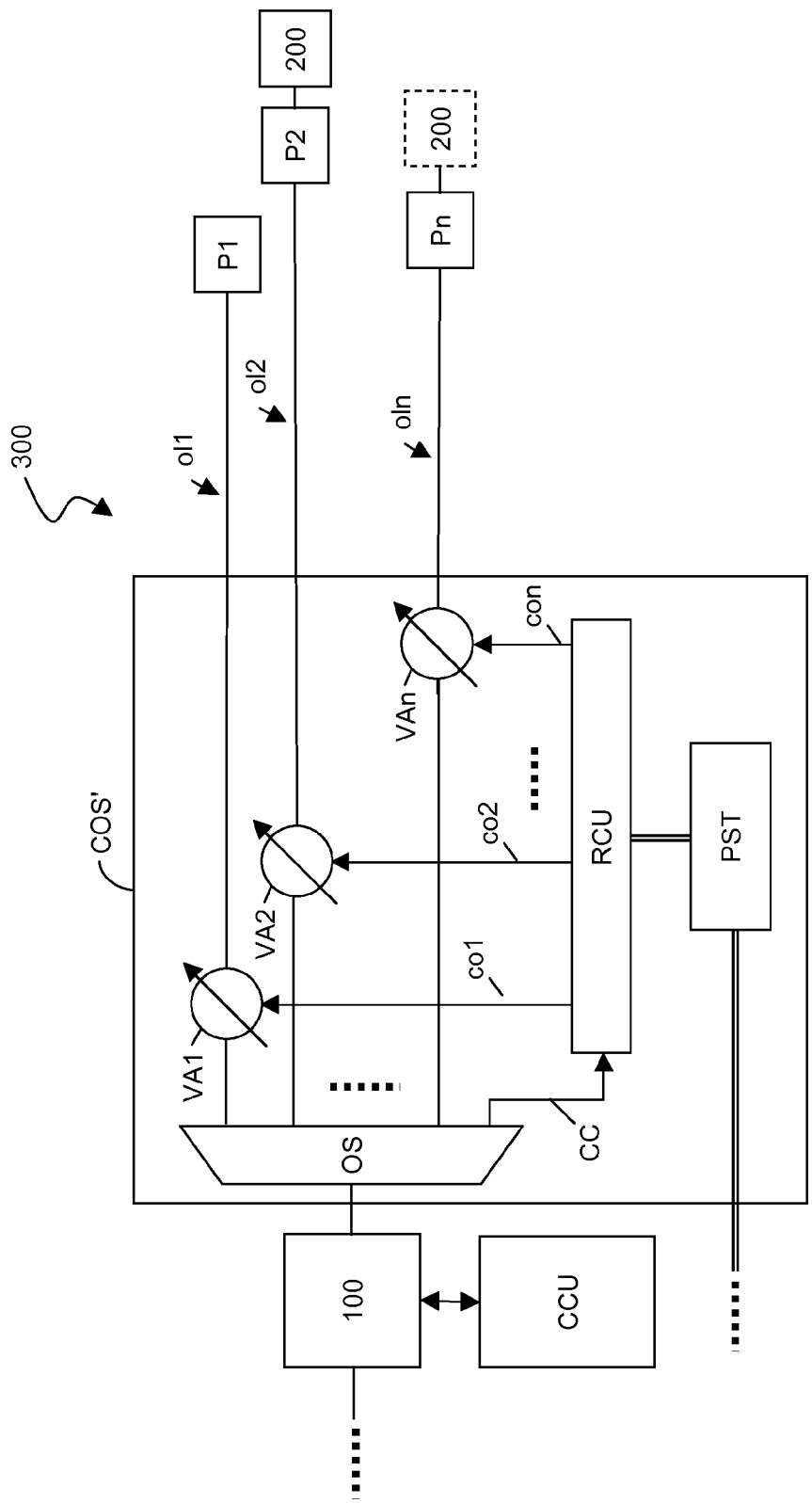
FIG. 3 schematically shows a PON suitable for implementing the method according to a second embodiment of the present invention.

FIG. 3 schematically shows a PON suitable for implementing the method according to a second embodiment of the present invention.

The comparison of FIG. 1 and FIG. 3 shows that the only difference between the two PONs is that the optical switches SW1, SW2, . . . , SWn of FIG. 1 are replaced by variable optical attenuators VA1, VA2, . . . , VAn. As known in the art, a variable optical attenuator is an optical element inducing an optical attenuation on an optical signal passing through it, the optical attenuation being controllable e.g. by means of mechanical means (e.g. a screw to be turned for adjusting the optical attenuation) or electronic means (e.g. a processor controlling the optical variable attenuator and having an interface by means of which a desired optical attenuation may be set).

According to first variants of this second embodiment, the optical splitter OS and the variable optical attenuators VA1, VA2, . . . , VAn are discrete components. According to second variants, the optical splitter OS and the variable optical attenuators VA1, VA2, . . . , VAn are part of a same integrated optical device.

Preferably, the n control outputs co1, co2, . . . con of the remote control unit RCU are suitable to transmit control signals from the remote control unit RCU to the variable optical attenuators VA1, VA2, . . . , VAn, in order to vary their optical attenuation between a working value $\alpha_w$ and a check value $\alpha_c$. The working value $\alpha_w$ is preferably different than the check value $\alpha_c$. More preferably, the working value $\alpha_w$ is lower than the check value $\alpha_c$. Further, the working value $\alpha_w$ is preferably equal to 0 dB (except the residual attenuation of the variable optical attenuators), in order to minimize the impact of the variable optical attenuators on the optical transmission between the OLT 100 and the optical links ol1, ol2, . . . , oln. On the other hand, the check value $\alpha_c$ is preferably chosen by taking into account the characteristics of the variable optical attenuators and of the OLT 100. In particular, the value $\alpha_c$ is preferably higher than the variable optical attenuator resolution and of the minimum variation of the received optical power that the OLT 100 is able to detect. For instance, the value $\alpha_c$ may be equal to 1 dB.

When all the variable optical attenuators VA1, VA2, . . . , VAn are controlled so that they induce an optical attenuation equal to the working value $\alpha_w$, the optical power of the optical signals received by the OLT 100 from an ONT is equal to a maximum value P0, which depends on the optical links ol1, ol2, . . . , oln to which the ONT is connected and on the transmission characteristics of the ONT. On the other hand, if one of the variable optical attenuators VA1, VA2, . . . , VAn (e.g. the variable optical attenuator VA1) is controlled so that its optical attenuation is increased to the check value $\alpha_c$, the optical power of the optical signals received by the OLT 100 from an ONT connected to the corresponding optical link (i.e. ol1) is reduced to a value P0–$\alpha_c$.

According to a second embodiment of the present invention, the above described mechanism of selectively varying the optical attenuation induced by the variable optical attenuators VA1, VA2, . . . , VAn is used for localizing an ONT, i.e. for allowing a service provider to check whether an ONT bought or leased by a given user upon subscription is actually used by connecting it always to the optical link which has been determined according to the localization information provided by the user upon subscription.

Figure 4:
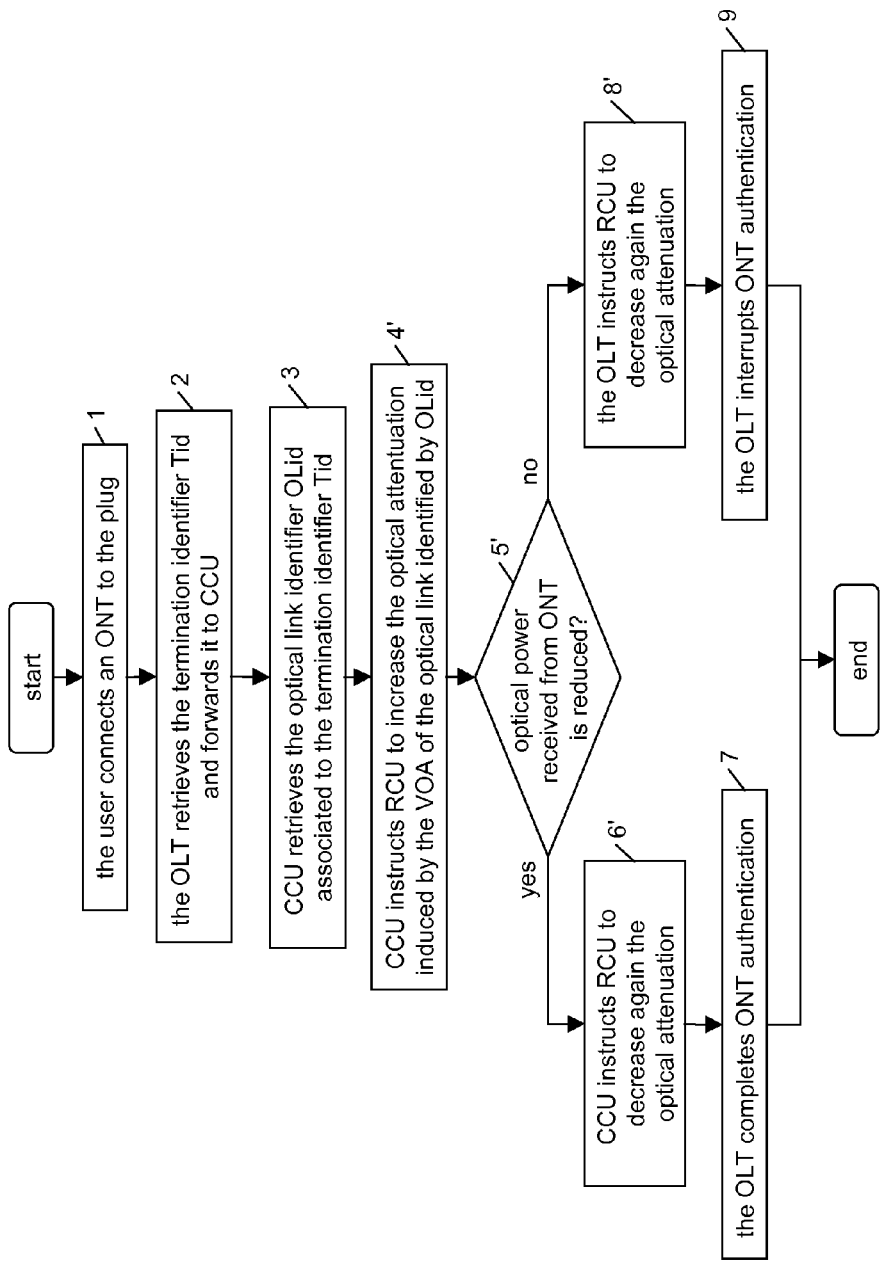
FIG. 4 is a flow chart showing the authentication procedure performed when an ONT is connected to the PON of FIG. 3.

In particular, by referring now to FIG. 4, it is assumed that a user residing in the building in which the PON of FIG. 3 is installed buys a subscription for a given packet of broadband services distributed by means of the PON of FIG. 3.

Similarly to the above flow chart of FIG. 2, upon subscription the user is requested to provide localization information allowing the service provider to determine an optical link identifier OLid univocally identifying the optical link to which the user intends to connect the ONT for accessing the broadband services. As mentioned above, the localization information may be either the user's complete address or the plug code. Again, it is assumed that the user resides in the apartment in which the optical link ol2 is terminated by means of the plug P2. Accordingly, the optical link identifier OLid determined by the service provider according to the localization information provided by the user during subscription identifies the optical link ol2.

Further, as mentioned above, upon subscription the user either buys or leases an ONT 200 for accessing the subscribed services. Preferably, the ONT 200 has a termination identifier Tid, which univocally identifies it. For instance, the termination identifier Tid may be the serial number of the ONT 200.

Preferably, during subscription, the service provider preferably stores an association between the optical link identifier OLid determined according to the localization information provided by the user and the termination identifier Tid of the ONT 200 bought or leased by the user. Further, preferably, the service provider stores this association so that it may be accessed by the central control unit CCU. For instance, the service provider may store the association in a central database which can be accessed by the central control unit CCU. Alternatively, the service provider may also send the association to the central control unit CCU, which stores it in a local database (not shown in FIG. 3).

By referring to FIG. 4, when the user accesses the subscribed services for the first time, he preferably connects the ONT 200 to a plug (step 1). It is initially supposed that the user actually connects the ONT 200 to the optical link determined according to the localization information he has provided during subscription, i.e. the optical link ol2, as shown in FIG. 3.

Further, it is assumed that all the variable optical attenuators VA1, VA2, ..., VAn are controlled so that they induce an optical attenuation equal to the working value $\alpha_w$. Therefore, the OLT 100 receives from the ONT 200 traffic in the form of optical signals having a given optical power P0.

Since the OLT 100 is optically connected to the ONT 200, the OLT 100 starts transmitting and receiving authentication information to and from the ONT 200, through which the OLT 100 recognizes the ONT 200. In particular, according to embodiments of the present invention, the authentication information received by the OLT 100 preferably comprise the termination identifier Tid, and the OLT 100 is preferably configured to retrieve such a termination identifier Tid by processing the received authentication information and to forward it to the central control unit CCU (step 2).

Then, the central control unit CCU, which as mentioned above may access the association between the optical link identifier OLid determined according to the localization information provided by the user during subscription and the termination identifier Tid of the ONT 200 bought or leased by the user, preferably uses the retrieved termination identifier Tid for retrieving the optical link identifier OLid associated to the termination identifier Tid (step 3).

Then, the central control unit CCU instructs the remote control unit RCU by means of the control channel CC to increase to the check value $\alpha_c$ the optical attenuation induced by the variable optical attenuator connecting the optical splitter OS to the optical link identified by the retrieved optical link identifier OLid (step 4'). In particular, since it has been assumed that the optical link identifier OLid is the identifier of the optical link ol2, during step 4' the central control unit CCU preferably instructs the remote control unit RCU to increase to the check value $\alpha_c$ the optical attenuation induced by the optical variable attenuator VA2.

Therefore, after step 4' has been completed, the optical attenuation of the optical connection between the OLT 100 and the optical link ol2 is increased by the check value $\alpha_c$.

Then, the central control unit CCU checks whether the optical power of the optical signals received at the OLT 100 from the ONT 200 is reduced, i.e. is lower than P0 (step 5').

In the affirmative, the central control unit CCU determines that the ONT 200 is actually connected to the optical link determined according to the localization information provided by the user during subscription, i.e. ol2. Therefore, the central control unit CCU preferably instructs the remote control unit RCU to decrease again to the working value $\alpha_w$ the optical attenuation which has been increased during step 4', so that the OLT 100 starts again receiving traffic from the ONT 200 with the optical power P0 (step 6'). Then, preferably, the OLT 100 successfully completes the authentication of the ONT 200 (step 7), thus allowing the user to access any of the subscribed services by means of the ONT 200.

On the other hand, if during step 5' the central control unit CCU determines that the OLT 100 still continues receiving optical signals from the ONT 200 with the optical power P0 even though the attenuation induced by the variable optical attenuator VA2 has been increased, the central control unit CCU determines that the ONT 200 is not connected to the optical link determined according to the localization information provided by the user during subscription. Indeed, the optical connection between the OLT 100 and the optical link identified by the optical link identifier OLid has now an increased attenuation and, accordingly, also the optical connection between the OLT 100 and the ONT 200 should have an increased attenuation.

This situation occurs if the user connects the ONT 200 to an optical link other than the one identified by the optical link identifier OLid determined according to the localization information provided by the user during subscription, e.g. the optical link oln, as shown in FIG. 3 with dashed lines.

Therefore, in this case, the central control unit CCU preferably instructs the remote control unit RCU to decrease again to the working value $\alpha_w$ the optical attenuation which has been increased during step 4', thus bringing again the optical attenuation between the OLT 100 and the optical link ol2 to the working value $\alpha_w$ (step 8'). Then, preferably, the OLT 100 interrupts the authentication of the ONT 200 (9), and possibly the central control unit CCU instructs the OLT 100 to send a deactivation command to the ONT 200. In this way, the user who tried to access the subscribed services by connecting the ONT 200 to an optical link other than the one determined according to the localization information provided during subscription is prevented from accessing the services.

Therefore, advantageously, also according to this second embodiment of the present invention, the service provider may check whether the user actually uses the ONT 200 by connecting it to the link which has been determined according to the localization information provided by the user upon subscription, and not to other optical links of the same PON.

Further, the procedure shown in FIG. 4 may be advantageously performed without suspending the authentication of the ONT 200, since the optical connection between the OLT 100 and the ONT 200 is not interrupted during steps 4', 5', 6' and 8'.

Further, the procedure shown in FIG. 4 may be advantageously performed not only when the user activates the ONT 200 for the first time, but it can be repeated each time the ONT 200 is activated by the user. This advantageously allows the service provider to check that, each time the ONT 200 is activated, it is actually connected to the link which has been determined according to the localization information provided by the user upon subscription, and not to other optical links of the same PON. Also in this case therefore relocation of the ONTs is prevented.

Further, advantageously, also the above described procedure shown in FIG. 4 substantially has the same duration of a traditional authentication procedure of an ONT at an OLT. Indeed, the steps 4' and 5', which allow to determine whether the ONT is actually connected to the optical link determined according to the localization information provided by the user during subscription, may take only few seconds. In particular, increasing the optical attenuation induced by the variable optical attenuator for few seconds is enough for allowing the central control unit to determine whether the optical power of the optical signals received at the OLT 100 from the ONT 200 is reduced.

Further, advantageously, the working value $\alpha_w$ and the check value $\alpha_c$ may be chosen so that the OLT 100 is able to detect changes in the received optical power, but the quality of service of the service associated to the optical signals received by the ONT 200 is not affected. This advantageously allows to perform the above steps 4' and 5' not only during authentication, but also while the user is enjoying one of the subscribed services by means of the ONT. This advantageously allows to perform periodical checks of the location of the ONTs with no service interruption.

Further, advantageously, the ratio between the benefits provided to the service provider by the PON of FIG. 3 and the cost of the PON of FIG. 3 is substantially greater than that of a known PON. Indeed, the benefits due to the possibility to localize the ONTs outweigh the additional costs due to the inclusion in the PON of active devices (i.e. the remote control unit RCU and the optical variable attenuators VA1, VA2, . . . , VAn), which require power supply and whose cost is not negligible.

Also in this second embodiment, the Applicant has determined that the power consumption of such active devices advantageously is very low. Indeed, by assuming that the variable optical attenuators VA1, VA2, . . . , VAn are implemented as discrete components, each variable optical attenuator requires about 0.3 W. Besides, the remote control unit RCU requires a few Watts. Therefore, by assuming e.g. that the PON comprises 16 optical links the power consumption is of about 10 W, while by assuming that the PON comprises 32 optical links the power consumption is of about 15 W. Advantageously, since the electrical power required by the controlled optical splitter COS' is very low, also in this case it can be powered from a remote location, such as for instance by means of a dedicated powering unit located at the central office wherein the OLT and central control unit CCU are located, by using e.g. twisted pairs. This again advantageously allows to keep the cost of the PON very low.

According to an advantageous variant of this second embodiment, the operation of localizing the ONT may also be performed without the service provider generates an a priori association between the optical link identifier OLid and the termination identifier Tid. Indeed, according to this advantageous variant, the association is generated by the central control unit CCU.

In particular, the first time the OLT 100 detects that a new ONT has been connected to one of optical links radiating from the controlled optical splitter COS', the OLT 100 preferably informs the central control unit CCU, which preferably instructs the remote control unit RCU to operate all the variable optical attenuators VA1, VA2, . . . , VAn to increase one by one their attenuation to the check value $\alpha_c$.

In this way, the central control unit CCU is able to identify the optical link to which the new ONT is connected, and therefore to generate the association between the optical link identifier OLid identifying the optical link to which the new ONT is connected and the termination identifier Tid of the new ONT (which is still retrieved by the OLT 100 according to the authentication information exchanged with the new ONT). From then on, the authentication procedure described above and shown in FIG. 4 may be performed each time the new ONT is switched on.

In this way, advantageously, the service provider may determine whether, each time the ONT is used, it is always connected to the same optical link to which it was connected the first time it was used.

As disclosed above, the above described operation of identifying the optical link to which the new ONT is connected advantageously does not induce any service interruption for the previously connected ONTs. Anyway, according to more preferred variants, when the central control unit CCU instructs the remote control unit RCU to operate the variable optical attenuators, it may instruct the remote control unit RCU to operate only the variable optical attenuators which are not associated to any active ONT.

In the embodiments shown in FIGS. 1 and 3, optical switches and optical variable attenuators have been used for implementing the optical connections between the optical splitter OS and the optical links ol1, ol2, . . . , oln.

However, according to embodiments of the present invention not shown in the drawings, such optical connections can be implemented by using other optical components, provided that they are switchable by a remote control unit between a first status and a second status, and that switching between the first status and the second status induces a change in an optical parameter of optical signals received at the OLT through the corresponding optical connection, which change can be detected by the OLT. Examples of such optical components may be:

optical modulators, which are suitable for inducing a change of the frequency (or, equivalently, wavelength), phase or amplitude of the optical signals passing through them;

optical amplifiers, which are suitable for inducing an increase of the optical power of the optical signals passing through them;

variable delay lines, which are suitable for inducing a change in the optical delay of optical signals passing through them; and so on.

Besides, in the embodiments shown in the drawings, the control channel CC allowing the central control unit CCU to control the remote control unit RCU is implemented by means of the OLT 100 and one of the user-side ports of the optical splitter OS. The central remote unit CCU then controls the remote control unit RCU by means of optical signals similar to the optical signals carrying the traffic directed to the ONT(s). In other words, the control channel CC is one of the downstream channels managed by the OLT.

According to other embodiments not shown in the drawings, the control channel CC may be implemented as a separate channel which directly connects the central control unit CCU and the remote control unit RCU, bypassing the optical splitter OS. For example, the control channel CC may be implemented by using a dedicated wavelength on the PON, for instance a wavelength specified and dedicated to optical supervision of the PON itself.

Besides, the control channel CC is not necessarily implemented by an optical link. In particular, the control channel CC may be implemented by a POTS or a GSM modem, or even through a low rate communication channel superimposed on the same line used for power supplying the remote central unit RCU. In this case, all the n+1 user-side ports of the optical splitter are advantageously available for connecting ONTs. This embodiment is advantageous also in that the control channel is completely separated from the controlled ODN, thus improving its reliability.

The invention claimed is:

1. A method for localizing an optical network termination in an optical access network, said optical access network comprising an optical line termination and a number of optical links, said optical network termination capable of being connected to said optical line termination by means of any of said optical links, comprising:

detecting that said optical network termination is connected to one of said optical links and retrieving therefrom a termination identifier univocally identifying said optical network termination;

using said termination identifier for retrieving an optical link identifier associated with said termination identifier and univocally identifying a given optical link of said optical links;

inducing a change in an optical connection between said optical line termination and said given optical link, thereby modifying an optical parameter of first optical signals received at said optical line termination through said given optical link;

checking whether second optical signals received at said optical line termination from said optical network termination are affected by said change;

in the affirmative, determining that said optical network termination is connected to said given optical link; and
when not in the affirmative, determining that said optical network termination is not connected to said given optical link.

2. The method according to claim 1, further comprising:
before using said termination identifier for retrieving an optical link identifier, acquiring localization information from a user of said optical network termination and determining said optical link identifier associated with said termination identifier by processing said localization information.

3. The method according to claim 2, wherein acquiring localization information comprises one of the following:
acquiring an address of said user; and
acquiring a plug identifier identifying a plug terminating one of said optical links.

4. The method according to claim 1, further comprising:
before using said termination identifier for retrieving an optical link identifier, determining said optical link identifier associated with said termination identifier when said network termination is firstly connected to said optical access network through said given optical link.

5. The method according to claim 1, wherein detecting that said optical network termination is connected to one of said optical links, comprises exchanging authentication information between said optical line termination and said optical network termination and retrieving said termination identifier from said authentication information.

6. The method according to claim 1, wherein inducing a change in an optical connection, comprises modifying an optical parameter of said first optical signals passing through said optical connection, said optical parameter being one of frequency, phase, amplitude, optical power and optical delay.

7. The method according to claim 6, wherein:
inducing a change in an optical connection, comprises opening an optical switch capable of connecting said optical line termination to said given optical link; and
checking whether second optical signals received at said optical line termination comprises checking whether said second optical signals are still received at said optical line termination.

8. The method according to claim 6, wherein:
inducing a change in an optical connection, comprises increasing an attenuation induced by a variable optical attenuation capable of connecting said optical line termination to said given optical link; and
checking whether second optical signals received at said optical line termination, comprises checking whether an optical power of said second optical signals received at said optical line termination is reduced.

9. An optical access network comprising:
an optical line termination, a number of optical links, an optical connection capable of connecting said optical line termination to a given optical link of said optical links and an optical network termination capable of being connected to any of said optical links;
a remote control unit capable of operating said optical connection so as to induce a change in an optical parameter of first optical signals received at said optical line termination through said given optical link; and
a central control unit capable of
determining that said optical network termination is connected to said given optical link when said change has affected second optical signals received at said optical line termination from said optical network termination; and
determining that said optical network termination is not connected to said given optical link when said change has not affected said second optical signals received at said optical line termination from said optical network termination.

10. The optical access network according to claim 9, wherein said optical connection comprises an optical switch capable of being switched between an open status and a close status by said remote control unit.

11. The optical access network according to claim 9, wherein said optical connection comprises a variable optical attenuator capable of being switched between a first status and a second status by said remote control unit, said variable optical attenuator in said first status inducing a working attenuation on said first optical signals, and said variable optical attenuator in said second status inducing a check attenuation on said first optical signals, said working attenuation being different from said check attenuation.

12. The optical access network according to claim 9, wherein said remote control unit and said central control unit are linked by a control channel, said control channel capable of being separated from said optical links.

13. The optical access network according to claim 9, further comprising an optical splitter between said optical line termination and said optical connection, said optical splitter and said optical connection being part of a same integrated optical device.

14. The optical access network according to claim 9, wherein said remote control unit further comprises a power supply terminal capable of supplying said remote control unit by drawing electrical current from a remote generator or from an electrical mains.

* * * * *